United States Patent [19]
Waddington

[11] Patent Number: 6,111,006
[45] Date of Patent: Aug. 29, 2000

[54] PROCESS FOR PREPARING FILMS AND COATINGS

[75] Inventor: Simon Dominic Waddington, Uccle, Belgium

[73] Assignee: Monsanto Company, St. Louis, Mo.

[21] Appl. No.: 08/663,088

[22] PCT Filed: Dec. 19, 1994

[86] PCT No.: PCT/GB94/02761

§ 371 Date: Jul. 7, 1997

§ 102(e) Date: Jul. 7, 1997

[87] PCT Pub. No.: WO95/17454

PCT Pub. Date: Jun. 29, 1995

[51] Int. Cl.$^7$ ........................................................... C08K 3/38
[52] U.S. Cl. ........................................ 524/404; 427/407.1
[58] Field of Search ........................... 427/407.1; 524/404

[56] References Cited

U.S. PATENT DOCUMENTS 4,537,738  8/1985  Holmes ................................. 264/210.5

*Primary Examiner*—Edward J. Cain
*Attorney, Agent, or Firm*—Jon H. Beusen, Esq.; Howrey Simon; Arnold & White LLP

[57] ABSTRACT

Extrusion films and coatings are prepared by applying a polyhydroxyalkanoate (PHA) to a surface which is in the range from 20° C. above to 20° C. below the optimum crystallisation temperature of the PHA. A PHA of high melt flow index is preferred.

16 Claims, No Drawings

PROCESS FOR PREPARING FILMS AND COATINGS

This invention relates to a process of preparation of polymer films and polymer coatings on substrates, to the use of certain polymer compositions for the preparation of such films and coated substrates and to certain polymer compositions. In particular the invention relates to the use of polyhydroxy-alkanoate polyesters in such method and certain compositions thereof.

Films of polymers have many uses. Free standing films of plastics materials have innumerable industrial and consumer applications. Supported films, for example, coated paper, are also widely useful, particularly for imparting the qualities of moisture resistance and heat-sealability to the coated support.

In principle, films can be prepared from polymer either by using a preparation of molten polymer or by the use of a solution of polymer in a suitable solvent. In the latter case, it is clearly necessary to match a polymer with a suitable solvent for it; for polyhydroxyalkanoate polymers, which have the merit of being biodegradable, a problem exists in that the suitable solvents are generally chlorinated and therefore environmentally detrimental. Attention has therefore diverted to attempting to prepare films of these biodegradable, and hence environmentally friendly, polymers from molten preparations of the polymer; and it is to this area that the present invention is directed.

Extrusion coating of polymer films from molten polymer has been developed for a number of plastics, in particular low density polyethylene. The standard procedure is for molten polyethylene to be extrusion coated onto a chilled roller, known in the art as a chill-roll. Low density polyethylene crystallises very quickly, and at reasonably low temperatures, so that it is adequately crystalline before it is drawn off the chill-roll, even when the roll is operating at very high line speeds, such as 700 m/min. Polyhydroxyalkanoate polymers crystallise much more slowly than low density polyethylene at typical chill-roll temperatures.

The process of polyhydroxyalkanoate crystallisation from the molten state involves growth of spherulites, which are spherical regions of crystallised material around a nucleus. Such a nucleation site may occur in the pure polymer or can be artificially introduced by the use of a nucleating agent. The optimum temperature for creating nucleating sites is considerably lower than the optimum temperature for growth of the spherulites. However the optimum temperature for crystallisation is a combination of the two parameters and usually falls between the two parameters.

It has now been found that it is possible to adapt a chill-roll process for the preparation of a polyhydroxyalkanoate film if the film formation is allowed to take place on the roll at a relatively high temperature compared to conventional extrusion coating processes, so as to improve or optimise crystallisation. The use of a high temperature chill roll allows relatively high line speeds and particularly high line speeds can be achieved using polyhydroxyalkanoate polymer with a high melt flow index (MFI).

Thus, according to a first aspect of the present invention, there is provided a process for the preparation of extruded film or extrusion coating of a polyhydroxyalkanoate polymer, the process comprising applying a layer of molten polyhydroxyalkanoate to a surface which is at a temperature in the range from 20° C. above to 20° C. below the optimum crystallisation temperature of the polymer, so as to form a film or coating.

Crystallisation temperature range is dependent on the co-polymer content and various additives, primarily the nucleating agent.

The molten PHA preferably has a MFI of 12 or greater, especially 18 to 35.

Therefore, in a further embodiment of the present invention there is provided a process for the preparation of extruded film or an extrusion coating of a polyhydroxyalkanoate polymer, the process comprising applying a layer of molten polyhydroxyalkanoate having a melt flow index of 12 or greater to a surface which is at a temperature in the range from 20° C. above to 20° C. below the optimum crystallisation temperature of the polymer, so as to form a film or coating. The melt flow index may be determined according to the standard ASTM-D1238-906.

The present invention enables the film or coating formation to be carried out in a single stage process and allows much higher line speeds to be achieved than were previously possible by a single stage process.

The invention may be carried out with stereo-regular PHAs, which may be produced by biological processes.

The polymer is especially one which is capable of a relatively high level of crystallinity, for example over 30%, especially 50–90%. Suitably it is or includes at least one biologically produced polyhydroxyalkanoate (PHA) having units of formula I:

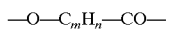
$$—O—C_mH_n—CO—\qquad\qquad I$$

where m is in the range 1–13 and n is 2m or (when m is at least 2) 2m–2. Typically $C_mH_n$ contains 2–5 carbon atoms in the polymer chain and the remainder (if any) in a side chain. In very suitable polyesters m is 3 or 4, n is 2m and especially there are units with m=3 and m=4 copolymerised together with respectively a $C_1$ and $C_2$ side chain on the carbon next to oxygen. Particular polyesters contain a preponderance of m=3 units, especially with at least 70 mol % of such units, the balance being units in which m=4. The molecular weight of the polymer is for example over 50000, particularly over 100000, especially over 300000, up to, e.g. $2×10^6$.

Polyester containing only m=3 units is PHB, polyester containing m=3 and m=4 units is polyhydroxy-butyrate-co-valerate (PHBV). The polyester can also be a blend of two or more PHAs differing in the value of m. A particular example contains:

(a) polymer consisting essentially of Formula I units in which
 2–5 mol % of units have m=4, the rest m=3; and
(b) polymer consisting essentially of Formula I units in which
 5–30 mol % of units have m=4, the rest m=3.

The proportions of the polymers in such a blend are preferably such as give an average m=4 content in the range 4–18 mol %.

The polyhydroxyalkanoate can be a fermentation product, especially of a microbiological process in which a microorganism lays down polyhydroxyalkanoate during normal growth or is caused to do so by cultivation in the absence of one or more nutrients necessary for cell multiplication. The microorganism may be wild or mutated or may have had the necessary genetic material introduced into it. Alternatively the necessary genetic material may be harboured by a eukariote, to effect the microbiological process.

Examples of suitable microbiological processes are the following:
for Formula I material with m=3 or m=partly 3, partly 4:
 EP-A-69497 (*Alcaligenes eutrophus*);

for Formula I materials with m=3: U.S. Pat. No. 4,101,533 (*A. eutrophus*), EP-A-144017 (*A. latus*);

for Formula I material with m=7–13: EP-A-0392687 (various Pseudomonas).

In such processes the polymer can be extracted from the fermentation product cells by means of an organic solvent, or the cellular protein material may be decomposed using an aqueous route leaving microscopic particles of polymer. For specialised end uses the cellular protein may be partly or wholly allowed to remain with the polymer, but preferably subjected to cell breakage.

Alternately the PHA may be synthesised by chemical processes known in the art. PHB can be prepared according to Bloembergen, S. and Holden, D. A., Macromolecules. 1989, Vol 22, p1656–1663. PHBV can be prepared according to Bloembergen, Holden, Bluhm, Hamer and Marchessault, Macromolecules. 1989, Vol 22, p1663–1669.

The invention is applicable also to synthetic polymers which are capable of crystallisation, especially:

a polyester, for example head-to-tail polyester or (preferably) substantially stoichiometric head-to-head tail-to-tail polyester;

b polyester having only alcohol or phenol reactivity or only acyl reactivity;

c other polymers, such a polyamides, having potential acylatable and or esterifiable groups.

Such polymers may be used alone or with one or more microbiologically derived polymers as described above. Examples of suitable synthetic polymers are synthetic polyhydroxyalkanoates, polylactides and copolymer of succinic acid and butylene glycol.

In or with the polymer there may be other materials present, in particular one or more plasticisers may be present. The ratio of plasticiser to polymer depends on the intended use of the composition. The range 2–40 phr w/w includes most of the likely uses. For making effectively rigid but not brittle articles the range 5–20 especially 6–12, phr w/w is generally suitable.

Any of the known plasticisers for these polymers are suitable and any plasticisers which are found to plasticise these polymers subsequent to this invention would be suitable for use herein. Examples of suitable plasticisers are:

(a) high boiling esters of polybasic acids, such as phthalates, isophthalates, citrates, fumarates, glutamate, phosphates or phosphites. The esterified radicals may be for example $C_1$–$C_{12}$ alkyl, aryl or aralkyl. Particular examples are dioctyl-, dibeptyl- and dirindecyl-phthalates and dialkylalkylene oxide glutamate (Plasthall 7050);

(b) high boiling esters of polyhydric alcohols, especially glycols, polyglycols and glycerol. The acid derived radicals of the ester typically contains 2–10 carbon atoms. Examples are triacetin, diacetin and glyceryl dibenzoate;

(c) aromatic sulphonamides such as paratoluene sulphonamide.

A particularly preferred plasticiser is a doubly esterified hydroxycarboxylic acid having at least 3 ester groups in its molecule. "Doubly esterified" means that at least some of the hydroxy groups of the hydroxycarboxylic acid are esterified with a carboxylic acid and at least some of the carboxy groups thereof are esterified with an alcohol or phenol. Preferably at least the hydroxycarboxylic acid from which the ester is derived is aliphatic or cycloaliphatic. Its backbone structure (that is, apart from carboxy groups) preferably contains 2–6 carbon atoms. It contains preferably 2–4 carboxy groups and 1–3 hydroxy groups; and preferably the number of carboxy groups exceeds the number of hydroxy groups. An example of such a plasticiser is Estaflex* (acetyltri-n-butyl citrate).

In the process of the invention, the film is formed by applying the layer of the molten polyhydroxyalkanoate polymer to a surface. This application can be achieved by melt extrusion through an appropriately configured melt extrusion die. The configuration of the die is not believed to be particularly critical, and the precedents set in low density polyethylene melt extrusion methodology can be followed or readily adapted by those skilled in the art. However, when using high MFI polyester the die gap is preferably between from 0.1 mm to 0.5 mm and especially 0.1 mm to 0.3 mm Molten polyhydroxyalkanoate may be co-extruded with one or more other polymers, which may have additional useful functionality (for example, by functioning as adhesives or barrier layers, for example). Generally and preferably the polyhydroxyalkanoate will be the layer which comes into contact with the surface of the chill-roll.

By means of the invention, films may be formed onto a substrate, which thereby becomes extrusion coated. The substrate may be any suitable material, such as paper, board or fabric, which may be knitted, woven or even non-woven. In the case of a non-woven fabric, the melt may penetrate into the non-woven structure, following the contours of the fabric. The substrate could also be a film of a second polymer. The second polymer should be a compatible polymer if a multilayer film is required. Alternatively, the second polymer should be non-compatible if it is to be stripped from the first; this may leave the polyhydroxyalkanoate film with qualities superior to a comparable cast film.

A substrate may, prior to being coated, be pre-treated for example, by a corona treater. In practice, any suitable pre-treatment can be used if pre-treatment is required at all.

The invention is also suitable for preparing cast films, in which the polyhydroxyalkanoate film is not supported by a substrate. The film may be cast either onto a roller, as in certain chill-roll processes known from polyethylene casting, or the invention may use an adaption of such a process, for example, using an endless belt instead of a roller. The cast film may then be stretched, if required, before or while heating of the film takes place.

The temperature of the chill-roll or other surface on which the polymer is cast may be controlled by any suitable means. Suitable direct means include gas burners and electrical heating. A heat transfer fluid such as water or oil may, when appropriately remotely heated, be used in an indirect heating system.

The temperature of the surface used in the invention will depend on the optimal crystallisation temperature of the polymer from which film is being formed, which in turn varies with the polymer compositions. These crystallisation temperatures for polymers suitable for use in the invention can readily be determined by those skilled in the art. Typically, optimal crystallisation temperatures of suitable polymers will be in the range from 35° C. to 85° C., particularly 50° C. to 70° C.

The method of determining the optimal crystallisation temperature is by Differential Scanning Calorimetry (DSC). In this method a Perkin Elmer DSC-7 is operated under programmed heating control from 20 to 200° C. at 20° C. min$^{-1}$ to measure melting behaviour. Crystallisation behaviour is monitored by cooling from 200 to 20° C. at 20° C. min$^{-1}$. From these measurements the melting peak temperature ($T_{m\ peak}$) and the crystallisation peak temperature ($T_{cryst}$) and enthalpies of fusion and crystallisation $\Delta H_{fus}$ and $\Delta H_{cryst}$ are determined.

At the temperature of the chill-roll or other surface used for film formation in the invention, crystallisation will occur at the temperatures used. This will enable higher line speeds to be used.

The crystallisation temperature may vary from polymer to polymer. In a polyhydroxybutyrate/valerate copolymer, it may vary with hydroxyvalerate content.

It is preferable in the present invention to use a polymer of high MFI, preferably 12 or greater, especially 18 to 35. The MFI can be measured by standard methods known in the art. The method used herein is ASTM-D1238-90b.

It is possible to raise the MFI of a polymer by different methods. For example, it is possible to obtain high MFI polymer by adding one or more plastisicers. In the present invention it is preferred to heat treat the polymer one or more times to degrade the average molecular weight (Mw). Most suitably the polymer produced by this method has a weight average Mw of 350,000, and preferably 300,000 or below. Two useful methods to degrade the polymer are by extrusion compounding or by taking polymer and degrading with a basic solution, e.g. ammonium hydroxide.

The presence of a nucleating agent is often preferable in the polymer composition. Examples of conventional nucleating agents (to which the invention is no limited) include boron nitride (EP-A-0291024), ammonium chloride (WO-A-9919759) and DZB/ZnSt (EP-A-0400855). The amount of nucleating agent if present will generally be less than or equal to one part per hundred resin (phr) if only because of the wasted cost of adding excess nucleating agent. The lower limit of nucleating agent present is effectively 0 phr, which is to say that its presence is optional.

Another optional ingredient in the polymer composition is a release agent. Conventional release agents may be used, but the invention is not in any way restricted to the use of release agents which are known to date.

The polymer composition may contain any of the usual polymer processing additives, for example particulate fillers, reinforcing fibres and pigments.

However it is not usual to have these present in extrusion coating grades as it can affect the stability of the melt during draw-down from the die.

Films, whether coated on a web or free-standing, of various thicknesses can be produced by means of the invention. In particular, supported films (i.e. coatings), of from 1 to 100 $\mu$m, and typically from 5 to 50 $\mu$m, may be produced, and free standing films of from 5 to 150 $\mu$m and typically from 10 to 100 $\mu$m. It is also possible to use this process to make thick films greater than 150 $\mu$m. It should be noted that the thicker the film the greater the heat transfer required to crystallise the coating therefore, thicker films often require slower lines speeds to be used with a heated chill roll.

The invention may be used to produce polyhydroxyalkanoate films at higher line speeds than has hitherto been possible in a single stage process. For example, line speeds of up to 300 m/min, typically 50 to 200 m/min are envisaged for extrusion coating. For cast film production line speeds up to 100 m/min and typically 10 to 50 m/min are envisaged. For thick film production line speeds up from 4 to 30 m/min are envisaged.

According to a further aspect of the invention there is provided film and coated substrates produced by the process as defined herein.

The invention will now be illustrated with the following Examples.

EXAMPLE 1

A formulation of polyhydroxybutyrate/valerate copolymer was prepared having a hydroxyvalerate content of 5 mol % and 1 phr boron nitride nucleating agent. The granules had a molecular weight of 284,000 and MFI of 17 as measured by ASTM method no. 1238-90b, 2.16 kg load at 180° C.

Granules of the formulation were fed into an extruder with a 40 mm diameter screw. The screw was operated at a speed of 30–70 rpm. The extruder fed into a 20 cm wide die. The temperature of the melt was from 170 to 197° C. as measured by thermocouples in the adaptor. The molten polymer was extruded into the nip between a first nip-roll and the chill-roll. A gloss chill-roll was used. The chill-roll was held at a temperature of 60° C.; the die-gap was set to 0.2 mm; the air gap between the die and the nip was set to about 10 cm. The polymer was coated on to paper (38 g/m$^2$ or 80 g/m$^2$) and board (200 g/m$^2$), at line speeds of 55 to 100 m/min without the polymer exhibiting instability during draw-down of the melt.

The results for paper are given in Table 1.

TABLE 1

| Die Gap (mm) | Screw speed | line-speed |
| --- | --- | --- |
| 0.5 | 30 | 30–35 |
| 0.5 | 50 | 35–40 |
| 0.5 | 70 | 43 |
| 0.2 | 30 | 55–60 |
| 0.2 | 70 | 85 |

Various coat weights were produced depending on the screw speed, die-gap and the line speed. The coating was satisfactory in its appearance and ran smoothly through to the wind-up. The coated paper and board could be unwound without any difficulties.

EXAMPLE 2

Example 1 was repeated using a formulation of polyhydroxy-butyrate/valerate copolymer was prepared having a hydroxyvalerate content of 12 mol % and 1 phr boron nitride nucleating agent. The formulation was coated onto paper (40 g/m$^2$). The die gap was 0.3 mm. The die temperature was 190° C. The screw speed was varied from 20 to 80 rpm.

The results are presented in Table 2.

TABLE 2

| | line speeds (m/min) | | | |
| --- | --- | --- | --- | --- |
| MFI | 20 (rpm) | 40 (rpm) | 60 (rpm) | 80 (rpm) |
| 3–4 | 30 | 35 | 35 | — |
| 24.8 | 70 | 84 | — | 112 |
| 18 | 60 | 81 | — | 112 |
| 24.8 | 86 | 104 | — | 110 |

It can be seen from the results that at low MFI the line speeds remain relatively low despite raising the screw speed. At each screw speed the high MFI materials gave much superior line speeds.

What is claimed is:

1. A process for the preparation of extruded film or extrusion coating of a composition comprising a polyhydroxy-alkanoate, the process comprising applying a molten layer of the composition having a melt flow index of 12 or greater to a surface which is at a temperature in the range from 20° C. above to 20° C. below the optimum crystallisation temperature of the polymer, so as to form a film or coating, wherein the molten layer is applied to said surface at a line speed of 50 to 300 m/min for extrusion coating and 4 to 100 m/min for film production.

2. A process as claimed in claim 1 in which the polymer has a weight average molecular weight of 350,000 or below.

3. A process as claimed in claim 1 in which the polymer is capable of over 30% crystallinity.

4. A process as claimed in claim 1 in which the polymer includes at least one polyhydroxyalkanoate having units of formula

in which m is 1 to 13 and n is 2m or (if m is at least 2) 2m−2.

5. A process as claimed in claim 1 in which the polymer is a polyhydroxybutyrate.

6. A process as claimed in claim 5 in which the crystallization temperature is 35 to 85° C.

7. A process as claimed in claim 1 in which nucleation is induced by a nucleating agent.

8. A process as claimed in claim 8 in which the nucleating agent is boron nitride.

9. A process as claimed in claim 1 in which the polymer is stereo-regular.

10. A process as claimed in claim 1 in which the polymer is a biologically produced polyhydroxy-alkanoate.

11. A process as claimed in claim 1 which comprises applying a layer of molten polyhydroxy-alkanoate to a surface by melt extrusion through a die with a die gap of 0.1 to 0.5 mm.

12. A process as claimed in claim 1 in which the surface is that of a chill roll.

13. A process as claimed in claim 1 in which the composition contacts the surface directly.

14. A process as claimed in claim 1 in which the composition is coated onto paper or board.

15. A process as claimed in claim 4 in which the crystallization temperature is 50 to 70° C.

16. A process as claimed in claim 1 in which the polymer is a polyhydroxybutyrate-valerte comprising at least 70% hydroxybutyrate residues, the balance being hydroxyvalerate residues.

* * * * *